US010919213B2

(12) United States Patent
Jiang et al.

(10) Patent No.: US 10,919,213 B2
(45) Date of Patent: Feb. 16, 2021

(54) METHOD AND SYSTEM FOR FABRICATING COLORED 3D OBJECT

(71) Applicant: Zhuhai Seine Technology CO., Ltd., Zhuhai (CN)

(72) Inventors: Wei Jiang, Zhuhai (CN); Wei Chen, Zhuhai (CN); Jia Li, Zhuhai (CN); Xiaokun Chen, Zhuhai (CN); Yi Zhou, Zhuhai (CN)

(73) Assignee: ZHUHAI SAILNER 3D TECHNOLOGY CO., LTD., Zhuhai (CN)

( * ) Notice: Subject to any disclaimer, the term of this patent is extended or adjusted under 35 U.S.C. 154(b) by 240 days.

(21) Appl. No.: 16/106,292

(22) Filed: Aug. 21, 2018

(65) Prior Publication Data

US 2018/0370118 A1  Dec. 27, 2018

Related U.S. Application Data

(63) Continuation of application No. PCT/CN2016/093243, filed on Aug. 4, 2016.

(30) Foreign Application Priority Data

Mar. 2, 2016 (CN) .......................... 201610117648.6
Mar. 2, 2016 (CN) .......................... 201610119405.6

(51) Int. Cl.
*B29C 64/112* (2017.01)
*B29C 41/02* (2006.01)
(Continued)

(52) U.S. Cl.
CPC ............ *B29C 64/112* (2017.08); *B29C 41/00* (2013.01); *B29C 41/02* (2013.01); *B29C 41/22* (2013.01);
(Continued)

(58) Field of Classification Search
CPC ........................... B29C 64/386; B29C 64/205
See application file for complete search history.

(56) References Cited

U.S. PATENT DOCUMENTS 6,136,252 A     10/2000  Bedal et al.
2001/0040612 A1*  11/2001  Shimizu ............... B41J 2/17513
                                                            347/86
(Continued)

FOREIGN PATENT DOCUMENTS

CN     104191616 A     12/2014
CN     104742364 A      7/2015
(Continued)

OTHER PUBLICATIONS

The World Intellectual Property Organization (WIPO) International Search Report for PCT/CN2016/093243 dated Nov. 24, 2016 4 Pages.

*Primary Examiner* — Joseph A Miller, Jr.
(74) *Attorney, Agent, or Firm* — Anova Law Group, PLLC

(57) ABSTRACT

A method for fabricating a colored 3D object is provided. The method includes: forming, based on layer-structure data of a target object, a layer-structure product by printing of a molding material; forming a layer-print product by printing color inks on the layer-structure product based on layer-color data; and repeatedly forming the layer-print product to provide a plurality of the layer-print products, and fabricating a colored 3D object from the plurality of the layer-print products, stacked one over another. The color inks are printed synchronously or following the formation of the layer-structure product. A system for fabricating a colored 3D object includes a processing terminal, a print head, and a drive controller. The method and system improve a dimensional accuracy and printing efficiency of the colored 3D object.

11 Claims, 11 Drawing Sheets

(51) Int. Cl.
*B29C 41/00* (2006.01)
*B29C 64/393* (2017.01)
*B29C 64/386* (2017.01)
*B29C 64/205* (2017.01)
*B29C 41/22* (2006.01)
*B29C 67/00* (2017.01)
*B33Y 30/00* (2015.01)
*B33Y 10/00* (2015.01)
*B33Y 50/02* (2015.01)
*B29C 64/40* (2017.01)

(52) U.S. Cl.
CPC .......... *B29C 64/205* (2017.08); *B29C 64/386* (2017.08); *B29C 64/393* (2017.08); *B29C 67/0007* (2013.01); *B29C 64/40* (2017.08); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2004/0251574 A1* | 12/2004 | Collins | ................ | B29C 64/165 264/113 |
| 2005/0017394 A1* | 1/2005 | Hochsmann | .......... | B29C 64/165 264/113 |
| 2016/0001505 A1 | 1/2016 | Hakkaku et al. | | |

FOREIGN PATENT DOCUMENTS

| | | |
|---|---|---|
| CN | 104786496 A | 7/2015 |
| WO | 2014095872 A1 | 6/2014 |

* cited by examiner

METHOD AND SYSTEM FOR FABRICATING COLORED 3D OBJECT

CROSS-REFERENCE TO RELATED APPLICATIONS

This application is a continuation application of International Application No. PCT/CN2016/093243, filed on Aug. 4, 2016, which claims priority to Chinese Patent Application No. 201610117648.6 and No. 201610119405.6, both filed on Mar. 2, 2016. The above enumerated patent applications are incorporated herein by reference in their entity.

TECHNICAL FIELD

The present disclosure generally relates to the field of three dimensional (3D) objects and, in particular, relates to a method and a system for fabricating a colored 3D object.

BACKGROUND

In rapid molding technology, also known as rapid prototyping or additive manufacturing technology, materials are successively stacked layer by layer based on a layered three-dimensional (3D) model to fabricate a 3D object.

At present, rapid molding technologies for fabricating 3D objects include a fused deposition modeling (FDM) technology, a stereolithography (SLA) technology, a selective laser sintering (SLS) technology, a laminated object manufacturing (LOM) technology, a three-dimensional inkjet printing (3DP) technology, etc. Among them, using the 3DP technology to fabricate 3D objects is one of the hottest topics in recent years, especially in how to use the 3DP technology to fabricate fully-colored 3D objects.

Conventional methods for fabricating the colored 3D objects include use of magenta (M), yellow (Y), cyan (C), and black (BK), as molding materials for fabricating a 3D object. The four color inks are respectively accommodated in different inkjet print heads, and according to the data of a 3D model, the inkjet print heads are controlled by a drive controller to perform the layer-by-layer inkjet printing. Because the photocurable resin materials are used, each droplet of ink ejected by the print heads can have a certain volume after cured by light. A large number of cured ink droplets stacked one on another to form a 3D object. The principle of inkjet print heads for inkjet printing is that each pixel corresponds to one ink droplet. For example, when printing a red region, each pixel corresponds to a red ink droplet. To print a green region, each pixel needs a yellow ink droplet and a blue ink droplet. One pixel in the green region corresponds to two ink droplets and one pixel in the red region corresponds to one ink droplet, resulting in uneven surface of the 3D object and eventually affecting dimensional accuracy the 3D object. Therefore, colored objects can be printed only with a limited number of colors, and fully-colored objected cannot be printed.

Another conventional method includes use of magenta (M), yellow (Y), and cyan (C), such as three-color photocurable resins, and white (W) photocurable resins as a molding material to print a full-colored 3D object. However, when using this method to fabricate the colored 3D object, it must be ensured that physical properties, such as: a viscosity, a shrinkage ratio, and a surface tension, etc., of different materials are basically the same, especially the shrinkage ratio. If materials have inconsistent shrinkage ratio, the ink droplets cured by light have different sizes, resulting in uneven surface of the 3D object and eventually affecting dimensional accuracy of the 3D object. In addition, when using this method to fabricate a colored 3D object, the cost of manufacturing the molding materials is high.

SUMMARY

To solve the above technical problems, one aspect of the present disclosure provides a method for fabricating a colored 3D object by layer-by-layer printing, including: forming, based on layer-structure data of a target object, a layer-structure product by printing of a molding material; forming a layer-print product by printing color inks on the layer-structure product based on layer-color data, where the color inks are printed synchronously or following the formation of the layer-structure product; and repeatedly forming the layer-print product to provide a plurality of the layer-print products, and fabricating a colored 3D object from the plurality of the layer-print products, stacked one on another.

Optionally, at least a part of the color inks infiltrates into the layer-structure product to form the layer-print product.

Optionally, the molding material includes a photosensitive resin material, and the color inks include Eco solvent inks.

Optionally, the photosensitive resin material has a viscosity of 14 cps to 180 cps at 25° C. and a viscosity of 5 cps to 15 cps at 25° C. to 80° C.; and the Eco solvent inks have a viscosity of 4 cps to 14 cps, and a surface tension of 22 mN/m to 35 mN/m.

Optionally, when forming of the layer-structure product, the molding material is ejected by a variable-frequency ejection.

Optionally, the variable-frequency ejection is performed by an interval ejection or by alternating a full ejection with the interval ejection; and when forming the layer-print product, printing of the color ink is performed at locations where the molding material is non-ejected.

Optionally, in the variable-frequency ejection, when the full ejection is performed, a quantity of ejection orifices is an even number.

Optionally, a structure of the layer-structure product includes a grid structure.

Optionally, when the layer-print product is formed following the formation of the layer-structure product, repeatedly forming two adjacent layer-structure products includes a same printing direction; and when the layer-print product and the layer-structure product are synchronously formed, repeatedly forming two adjacent layer-structure products includes opposite printing directions.

Optionally, before the layer-structure product is formed, the method includes: layering the target object, and obtaining molding data corresponding to each layer of the target object according to structural information and color information of each layer, the molding data including the layer-structure data and the layer-color data.

Optionally, repeatedly forming the layer-print product further includes: forming, according to the layer-structure data, a layer-support product by printing of a supporting material, and the layer-support product is configured to provide a support for two adjacent layer-print products.

Optionally, forming the layer-structure product includes: using one molding material for printing; or using different molding materials for printing, where the different molding materials have a basically same shrinkage ratio.

Optionally, the molding material includes the least one of a white material, a transparent material and a light color material.

Another aspect of the present disclosure provides a system for fabricating a colored 3D object. The system may include a processing terminal, a print head, and a drive controller. The processing terminal may be configured to layer a target object and obtain molding data of the target object according to structural information and color information of each layer of the target object, the molding data including layer-structure data and layer-color data. The print head may be configured to eject printing materials and including at least one channel of a molding material and a plurality of channels of color inks. The print head is configured to: form a layer-structure product by printing of the molding material, based on the layer-structure data of the target object provided by the processing terminal; form a layer-print product by printing the color inks on the layer-structure product based on the layer-color data of the target object provided by the processing terminal; and repeatedly form the layer-print product to provide a plurality of the layer-print products, and fabricate the colored 3D object from the plurality of the layer-print products, stacked one over another. The drive controller may be configured to control the print head for printing according to the molding data of the target object.

Optionally, the print head includes one channel of the molding material, and the one channel of the molding material is disposed at one side of the channels of the color inks; or the print head includes two channels of the molding material, and the two channels of the molding material are respectively disposed at two sides of the channels of the color inks along a printing direction of the print head.

Optionally, the print head includes one channel of the molding material, and the one channel of the molding material is disposed in front of the channels of the color inks along the printing direction of the print head.

Optionally, the channels of the color inks include: a channel of a magenta ink, a channel of a yellow ink, and a channel of a cyan ink; or a channel of a magenta ink, a channel of a yellow ink, a channel of a cyan ink, and a channel of a black ink.

Optionally, the print head further includes at least one channel of the supporting material Optionally, LED lights are respectively disposed on two sides of the print head along the printing direction.

Optionally, the system includes a lifting platform configured to hold and move the colored 3D object.

In the method for fabricating a colored 3D object according to the present disclosure, a single type of molding material may be printed to form the layer-structure product. Dimensional instability due to the difference in shrinkage ratio between different materials can be avoided; and a process of filling with a white photocurable resin can be neglected, thereby improving the dimensional accuracy and printing efficiency.

In the method for fabricating a colored 3D object according to the present disclosure, through a layer-by-layer two-direction printing process, the molding efficiency can be improved, and the cost of molding can be reduced. Unlike conventional printing processes that a layer-print production is printed in one printing process, and the print head needs to reposition backward before a next printing process, in the disclosed layer-by-layer two-direction printing processes, the print head keeps printing while the print head is moving. The layer-structure product formed by printing of the molding material using the variable-frequency ejection method may have a grid structure, which can save the amount of molding material and reduce the printing cost to fabricate the colored 3D object. Because printing of the color ink is performed at locations where the molding material is non-ejected, the ejection of the droplets of the color inks can be more accurately positioned, and due to a barrier effect of the molding material, a bleeding phenomenon may be less likely to occur.

In the method for fabricating a colored 3D object according to the present disclosure, the Eco solvent color inks may be ejected on the layer-structure product to perform color printing; and because the Eco solvent color inks can partially infiltrate into the layer-structure product due to the osmosis of the Eco solvent color inks, a color structure layer can be formed, which not only can avoid a color-difference phenomenon between two adjacent layers due to bleeding of the color inks, but also is more environmentally friendly.

The method for fabricating a colored 3D object according to the present disclosure can have a wide color gamut and a vivid color of the colored 3D object formed by stacking the plurality of layer-print products, and transitions between different colors are natural.

In addition, the system for fabricating the colored 3D object according to the disclosure includes specific arrangements for the channel of the molding material, and the channels of the color inks, so as to improve utilization efficiency of each channel, and implement the method for fabricating the colored 3D object.

DESCRIPTION OF THE DRAWINGS

To clearly illustrate features, objects and advantages of the present disclosure, the drawings used in the description of the embodiments are briefly described below. Obviously, the accompanying drawings described below illustrate some but not all embodiments of the present disclosure. For those skilled in the art, other drawings may also be obtained based on these drawings without any creative work.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
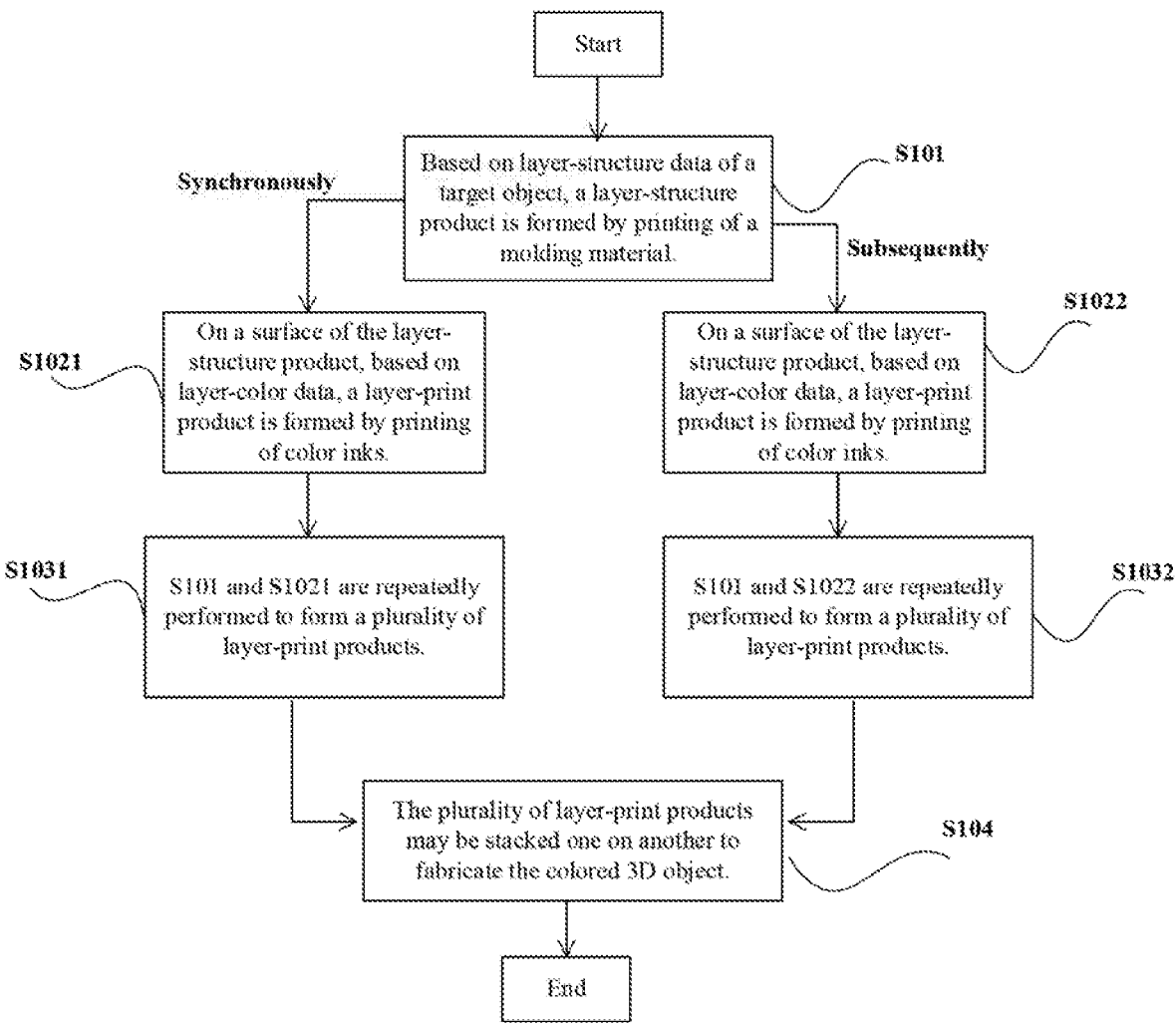
FIG. 1 illustrates a flowchart of an exemplary method for fabricating a colored 3D object according to some embodiments of the present disclosure.

FIG. 1 shows an exemplary method for fabricating a colored 3D object according to some embodiments of the present disclosure. The colored 3D object is fabricated by layer-by-layer printing. The method may include following exemplary steps. First, S101 may be performed.

In S101: Based on layer-structure data of a target object, a layer-structure product is formed by printing of a molding material.

Optionally, the layer-structure data may include N structural pixel data (i.e., data for a number of N structural pixels). Based on the N structural pixel data, a print head may eject the molding material at each position corresponding to each structural pixel, so as to form the layer-structure product. Further, the N structural pixel data may be spatial coordinate values corresponding to N structural pixels. Based on the spatial coordinate value corresponding to each of the N structural pixels, the drive controller may control a movement track of the print head, so as to print using the molding material at each position corresponding to each spatial coordinate value. The layer-structure product may constitute a partial structure of the colored 3D object, and may be configured to form an outline structure of the colored 3D object. Therefore, a single type of material may be used as the molding material, for example, a white or light color material, or a transparent material, etc. Advantages of using the single type of material may include avoidance of dimensional instability due to the difference in shrinkage ratio between different materials, and a curing speed can be controlled because only a single curing condition is applied. Optionally, according to embodiments of the present disclosure, different kinds of molding materials may also be used. However, in this case, the different types of molding materials may have the same or similar shrinkage ratio to maintain the dimensional accuracy of the colored 3D object.

Further, based on S101, subsequent steps can be divided into two main line processes. The difference between the two main line processes is whether the subsequent color printing step is performed synchronously, the molding material is printed to form the layer-structure product as described in S101. As shown in FIG. 1, in this example, a first main line process is that S1021 and S101 are performed synchronously.

In S1021: On a surface of the layer-structure product, based on layer-color data, a layer-print product is formed by printing of color inks on the layer-structure product. S1021 is performed synchronously with S101.

Optionally, the layer-color data may include M color pixel data (i.e., data for a number of M color pixels). Based on the M color pixel data, the print head may eject the color ink at each position corresponding to each color pixel, so as to form the layer-print product. The color ink may be ejected on the layer-structure product; therefore, the M color pixel data is correlated to the N structural pixel data. The color pixel data may include not only the spatial coordinate value corresponding to each of the color pixels, but also a color value corresponding to each of the color pixels. The color value may be color data based on a CMY (cyan, magenta and yellow) color model, a CMYK (cyan, magenta, yellow and black) color model, or another color model, and may be defined based on a two-dimensional (2D) printing technology.

Optionally, the manner in which S1021 and S101 are performed synchronously may be that: according to the structural pixel data, the print head ejects the molding material at each position corresponding to each of the structural pixels to form structural points; and then according to the color pixel data, the print head ejects the color ink at each of the structural points to form color structural points. As such, the color pixel data is correlated to the structural pixel data, that is, the spatial coordinate value of each color pixel is correlated to the spatial coordinate value of each structural pixel.

Further, S1031 may be performed. In S1031: S1021 and S101 are repeatedly performed to form a plurality of layer-print products.

In various embodiments, S1021 and S101 may be performed synchronously, e.g., the process of forming the layer-structure product and the process of printing the color inks on the layer-structure product are performed at the same time, therefore, the print head can print a layer-print product during one printing process and form another layer-print product during a next printing process, so as to form the plurality of layer-print products by repeating the above printing process.

As shown in FIG. 1, a second main line process includes performing S1022 after S101. That is, S101 is performed to form a layer-structure product by the layer printing, and then S1022 is performed.

In S1022: On a surface of the layer-structure product, based on layer-color data, a layer-print product is formed by printing of color inks. S1022 is performed after S101.

In various embodiments, S1022 may be performed according to a similar printing principle as for performing S1021, except that the manner for cooperatively implementing S1022 and S101 is different. The print head prints one layer-structure product in one printing process (achieved by executing S101), and in a next printing process, prints one layer-print product by using the color inks on the layer-structure product. Therefore, in the second main line process, two printing processes may be needed to form one layer-print product, while only one printing process may be needed to form one layer-print product in the first main line process. In various embodiments, based on a curing speed of the molding material and a color complexity of the colored 3D object, it can be determined which main line process to be used for printing. Optionally, if the curing speed is high and the color complexity is low, the first main line process may be used, and otherwise, the second main line process may be used.

Further, S1032 may be performed. In S1032: S1022 and S101 are repeatedly performed to form a plurality of layer-print products.

Further, based on foregoing exemplary steps in the first or second main line process, S104 may be performed.

In S104: The plurality of layer-print products may be stacked one on another to fabricate the colored 3D object.

Performing S104 may include a molding process. The target object is divided into multiple layers, and the multiple layer are printed and stacked layer by layer in the above steps to form the colored 3D object. Optionally, the stacking in S104 may not be the last step but accompany with the forgoing steps of the first or the second main line process. That is, stacking one layer may include forming a layer through S101 to S1031 or through S101 to S1032, and the stacking process is an accumulating process. The stacking process includes stacking not only along a extending direction of each layer, but also along the layered direction of the target object. The colored 3D object may be formed after all stacking processes are completed.

Figure 2:
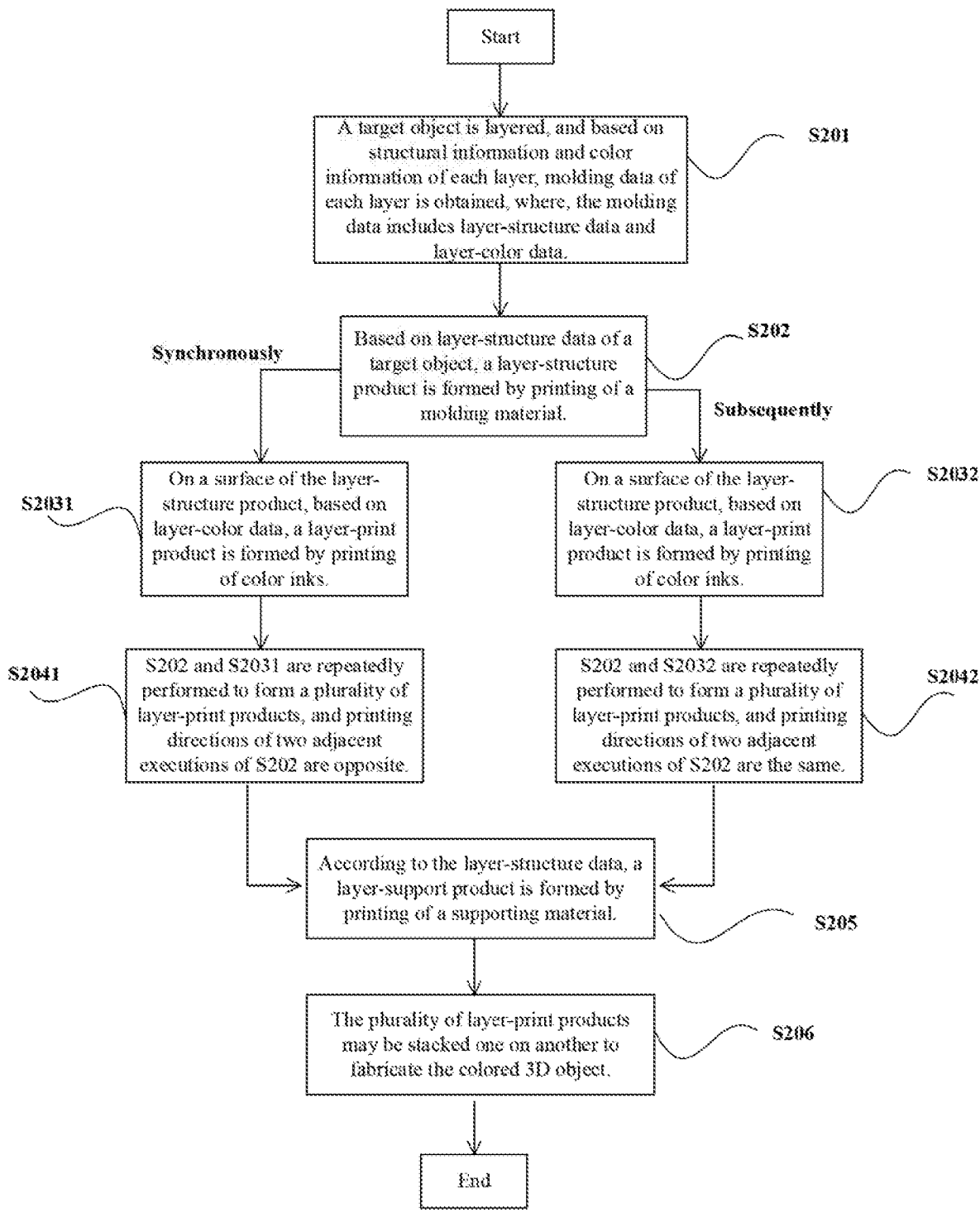
FIG. 2 illustrates a flowchart of another exemplary method for fabricating a colored 3D object including layering and obtaining molding data according to some embodiments of the present disclosure.

According to one embodiment of the present disclosure, FIG. 2 illustrates a flowchart of another exemplary method for fabricating a colored 3D object including layering and obtaining molding data according to some embodiments of the present disclosure. The method may include the following exemplary steps.

In S201: A target object is layered, and based on structural information and color information of each layer, molding data of each layer is obtained. The molding data includes layer-structure data and layer-color data.

S201 includes converting the target object into a form of data, and the structural information and the color information can be obtained by scanning the target object. The structural information and the color information can be further converted to a data file in a format that can be recognized by a slicing software of a processing terminal, e.g., STL format, PLY format, and WRL format, etc. Optionally, the structural information and the color information may be layer based, e.g., the target object after being scanned may be layered by the slicing software, the structural information and the color information of each layer may be obtained by analyzing each layer, and the structural information and the color information of each layer may be further converted to the layer-structure data and the layer-color data.

Optionally, the target object can also be directly drawn by a drawing software. The drawing software may include, for example CAD, Pro E, SolidWorks, UG, and 3D Max, etc. The target object drawn by the drawing software is a basic structure model of the target object. A color match may be performed on the basic structure model, and there are many commonly used methods for matching color. In one example, the basic structure model may be directly matched with colors and then converted into a PLY format. In another example, the basic structure model may be first converted to the a STL format and then matched with colors. Those skilled in the art can make various changes based on existing technologies, which is not elaborated herein.

Further, on the basis of S201, S202-S2041 (in the first main line process) or S202-S2042 (in the second main line process) may be performed, and the implementation manner can refer to descriptions about S101-S1031 or S101-S1032 as shown in FIG. 1. However, compared to S1031, S2041 further describes that when S202 and S2031 are repeatedly performed to form the plurality of layer-print products, printing directions of two adjacent executions of S202 are opposite. In conventional technologies, the print head can print a layer-print product in one printing process, and when the print head starts a next printing process, the print head need to reposition backward and then continue to synchronously execute S202 and S2031. In this way, printing directions of S202 in two adjacent printing processes are the same (two adjacent executions of S2031 have the same printing direction). According to embodiments of the present disclosure, after one printing process is completed, the backward reposition process can be omitted, and the next printing process is performed in an opposite direction with respect to the printing direction of the previous printing process. Therefore, in two adjacent printing processes, the printing directions of S202 are opposite (the printing directions of two adjacent executions of S2031 are also opposite). Compared to conventional technologies, embodiments of the present disclosure can omit the backward reposition process, thereby significantly improving the molding efficiency.

In addition, according to embodiments of the present disclosure, compared to S1032 shown in FIG. 1, S2042 further describes that when S202 and S2032 are repeatedly performed to form the plurality of layer-print products, printing directions of two adjacent executions of S202 are the same. Similar to S2041 of the first main line process, in S2042 of the second main line process, after one printing process is completed, the backward reposition process can also be omitted. In the second main line process, S202 and S2032 are performed alternately. When S2042 is performed, e.g., when S202 and S2032 are repeatedly performed, after the backward reposition process is omitted, the printing directions of S202 and S2032 are opposite. Correspondingly, printing directions of executions of two adjacent S202 to form the layer-structure products are the same. Similarly, when the curing speed is low, and the color complexity is high, through the printing method of the second main line process, the molding efficiency can also be improved.

Moreover, when S2041 or S2042 is performed, S205 may also be executed.

In S205: According to the layer-structure data, a layer-support product is formed by printing of a supporting material, where the layer-support product is configured to provide support for two adjacent layer-print products.

Figure 11:
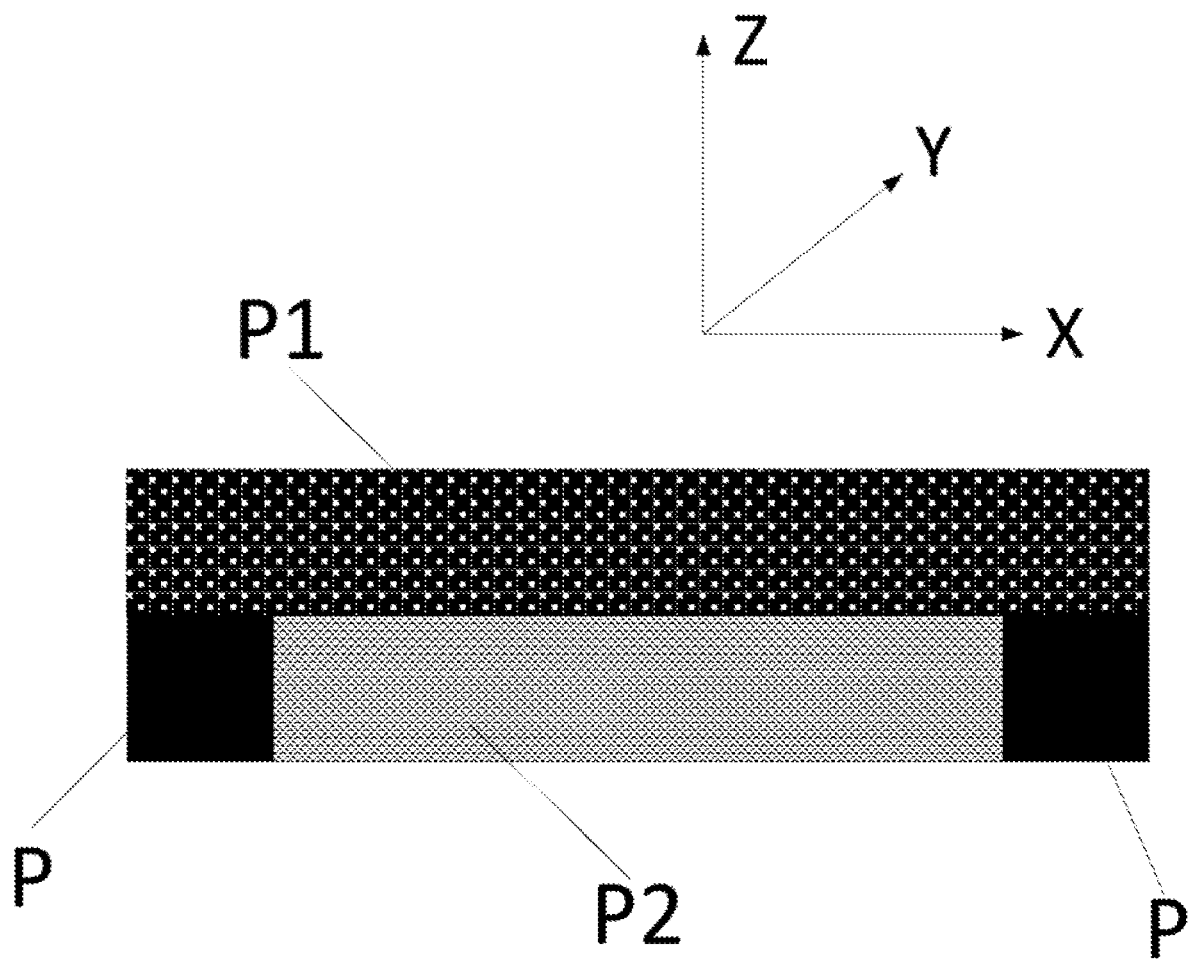
FIG. 11 illustrates a schematic diagram of two adjacent layer-print products and a layer-support product according to some embodiments of the present disclosure.

According to embodiments of the present disclosure, if two adjacent layer-print products have different structures and shapes, a scenario may occur that a part of a latter layer may overhead a previous layer. In this case, it is necessary to print a supporting layer when the previous layer is printed, so as to provide support for the latter layer and prevent collapse. FIG. 11 illustrates a location relationship between two adjacent layer-print products P1 and P2 and the layer-support product P, so that the purpose of S205 can be clearly presented. The printing principle of S205 is similar to the printing principle of S101, and when the supporting material is used to print, the spatial coordinate value corresponding to each supporting pixel may also be obtained by the layer-structure data. Further, in S201, when layer-structure data is obtained, a plurality of supporting pixels may be established based on the basic structure of two adjacent layers, the spatial coordinate value may be set for each of the supporting pixels, and a plurality of spatial coordinate values corresponding to the plurality of supporting pixels may be determined as a part of the layer-structure data.

Further, based on the foregoing executions of S201, S202, S2031-S2041 or S2032-S2042, and S205, S206 may be performed.

In S206: The plurality of layer-print products may be stacked one on another to fabricate the colored 3D object. A specific implementation manner of S206 is consistent with S104, and therefore, details are not described herein again.

Figure 3:
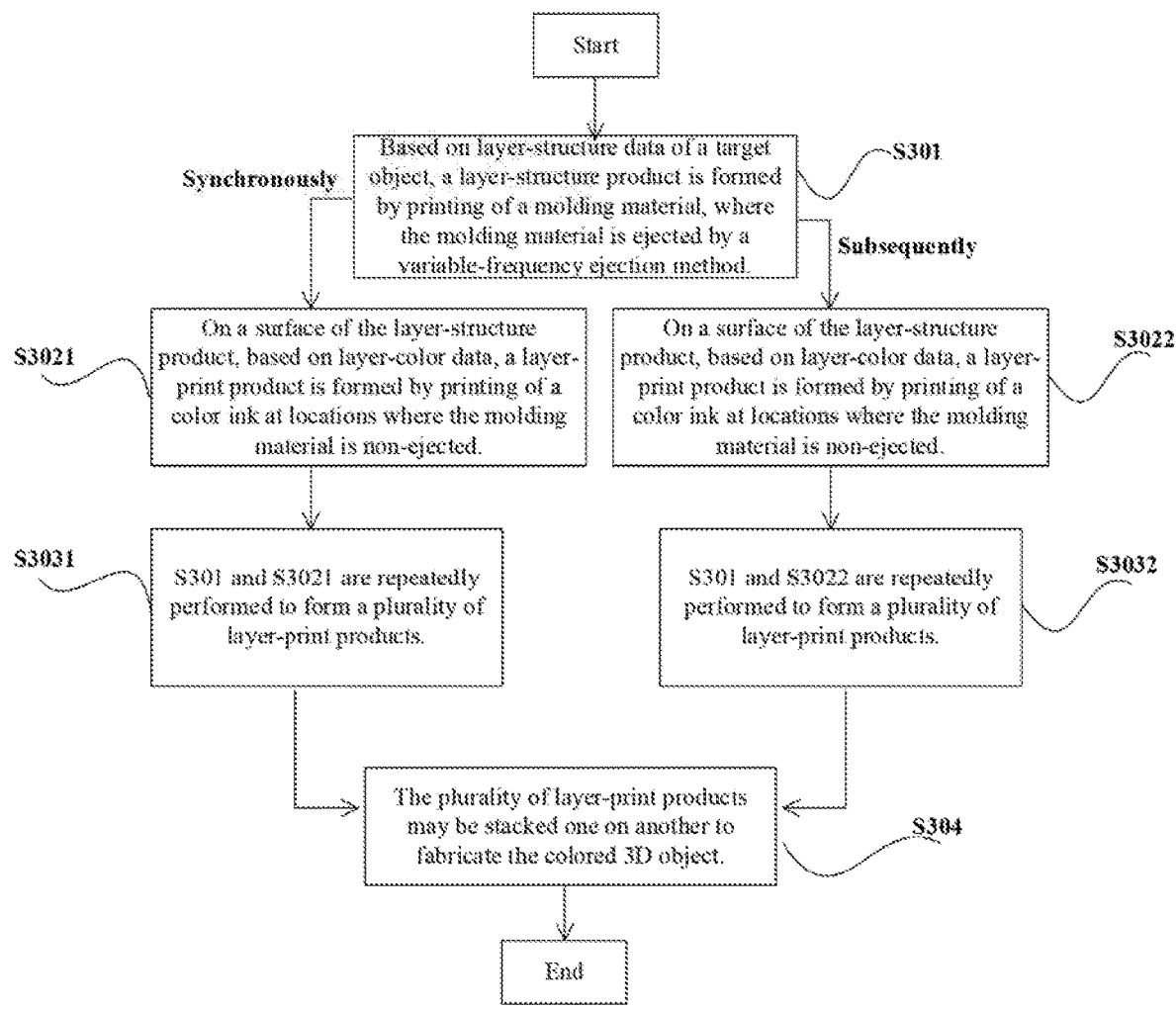
FIG. 3 illustrates a flowchart of another exemplary method for fabricating a colored 3D object using a variable-frequency ejection method to eject a molding material according to some embodiments of the present disclosure.

According to an embodiment of the present disclosure, FIG. 3 illustrates a flowchart of another exemplary method for fabricating a colored 3D object using a variable-frequency ejection method to eject a molding material according to some embodiments of the present disclosure, and the method may include the following steps. First, S301 may be performed.

In S301: Based on layer-structure data of a target object, a layer-structure product is formed by printing of a molding material, where the molding material is ejected by a variable-frequency ejection method.

The specific implementation of S301 may refer to S101. However, according to embodiments of the present disclosure, the molding material is ejected by a variable-frequency ejection method in S301. The variable-frequency ejection method is defined with respect to a full ejection method, and the full ejection method is that when the molding material is ejected, all ejection orifices on a channel of the molding material of the print head are used to eject the molding material. Correspondingly, the variable-frequency ejection method is that when the molding material is ejected, not all but a part of the ejection orifices on a channel of the molding material of the print head operate to eject the molding material. Optionally, when a variable-frequency ejection is performed, the ratio of working ejection orifices to all ejection orifices may be ¼, ⅓, ½, ¾, or other ratios. According to embodiments of the present disclosure, the working ejection orifices may be evenly spaced, or randomly distributed. Optionally, the quantity of ejection orifices on the channel of the molding material during the full ejection process may be an even number, so as to evenly distribute the working ejection orifices during the variable-frequency ejection process, thereby improving a positioning accuracy during printing of the color inks. Optionally, a center-to-center distance between two adjacent ejection orifices may match a droplet size of the molding material. For example, the center-to-center distance between two adjacent ejection orifices may be 1/360 dpi, i.e., about 0.07 mm. In this way, the layer-structure product formed by printing of the molding material using the variable-frequency ejection method may have a grid structure, which can save the amount of molding material and reduce the printing cost.

Figure 4:
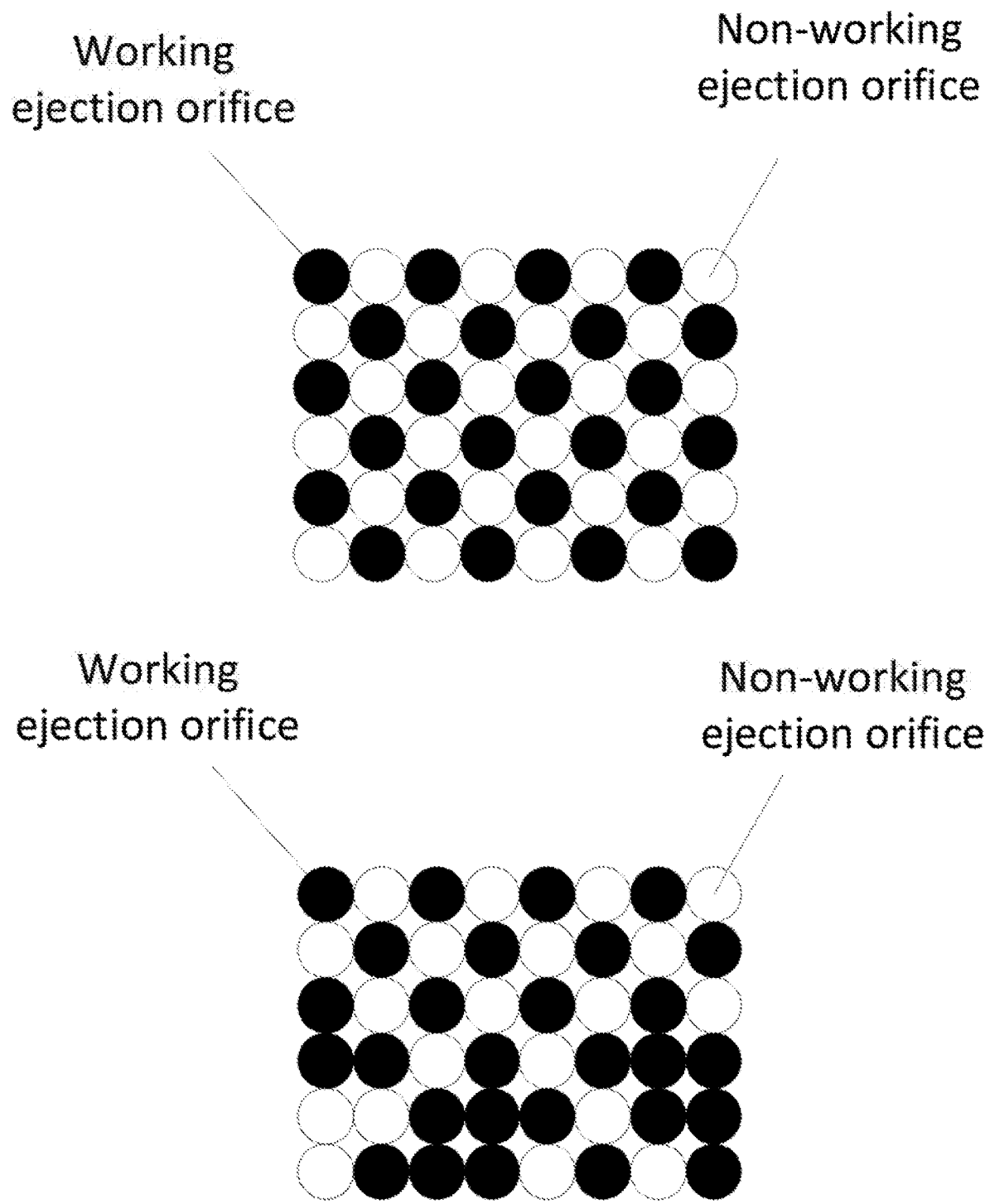
FIG. 4 illustrates an exemplary distribution pattern of ejection orifices of a channel of a molding material to achieve printing of the molding material according to some embodiments of the present disclosure.

According to an embodiment of the present disclosure, FIG. 4 illustrates an exemplary distribution pattern of ejection orifices of a channel of a molding material to achieve printing of the molding material according to some embodiments of the present disclosure, where the variable-frequency ejection is interval ejection. FIG. 4 shows distribution patterns for two types of ejection orifices, where black ejection orifices represent the working ejection orifices during the variable-frequency ejection process, while white ejection orifices represent the non-working ejection orifices during the variable-frequency ejection process. Optionally, as shown in FIG. 4, the distribution pattern of the working ejection orifices may be evenly spaced or not evenly spaced. More variations based on embodiments of the present disclosure can be made by those skilled in art and are not elaborated herein.

Figure 5:
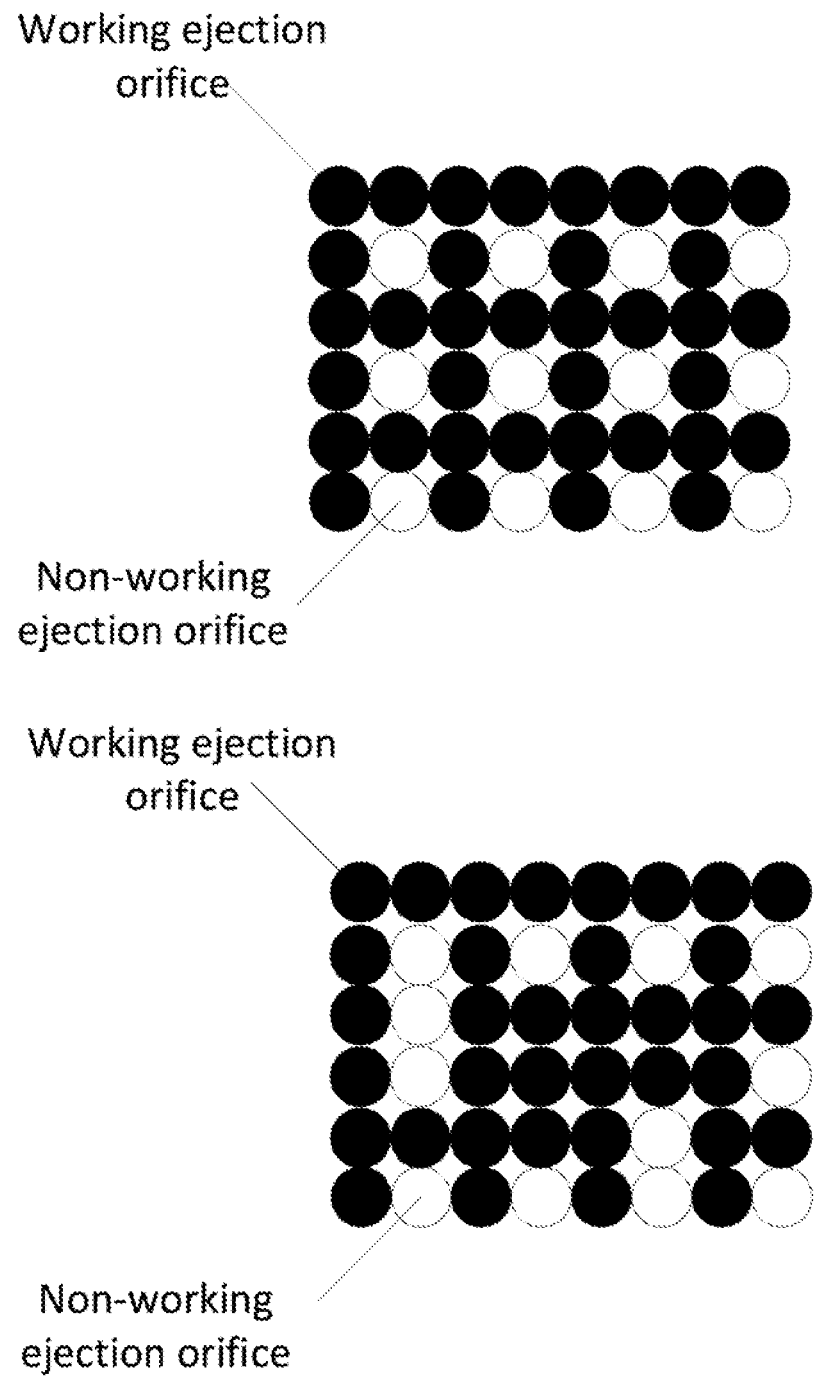
FIG. 5 illustrates another exemplary distribution pattern of ejection orifices of a channel of a molding material to achieve printing of the molding material according to some embodiments of the present disclosure.

According to another embodiment of the present disclosure, in FIG. 5 illustrates another exemplary distribution pattern of ejection orifices of a channel of a molding material to achieve printing of the molding material according to some embodiments of the present disclosure, where the variable-frequency ejection is alternating of interval ejection and full ejection. FIG. 5 shows distribution patterns for two types of ejection orifices, where black ejection orifices represent the working ejection orifices during the variable-frequency ejection process, while white ejection orifices represent the non-working ejection orifices during the variable-frequency ejection process. Optionally, as shown in FIG. 5, the distribution pattern of the working ejection orifices may be evenly spaced or not evenly spaced. More variations based on embodiments of the present disclosure can be made by those skilled in art.

Further, on the basis of S301, the subsequent steps are divided into two main line processes, which can refer to the implementation manner of the first main line process and the second main line process shown in FIG. 1. However, S3021 and S3022 are different from S1021 and S1022.

In S3021 (or S3022): On a surface of the layer-structure product, based on layer-color data, a layer-print product is formed by printing of a color ink at locations where the molding material is non-ejected. That is, the droplets of the color inks are ejected to locations with respect to the non-working ejection orifices of the channel of the molding material, referring to FIGS. 4-5.

Optionally, when S301 is executed, a grid-like layer-structure product may be constructed by structural points formed after curing of the droplets of the molding material. After S3021 is executed, color-structural points are formed by curing of the droplets of the color inks in openings of the grid-like layer-structure product. In this way, the ejection of the droplets of the color inks can be more accurately positioned, and due to a barrier effect of the molding material, a bleeding phenomenon may be less likely to occur.

Further, the manner in which S3021 and S301 are performed synchronously may be that: according to the structural pixel data, the print head ejects the molding material at each position corresponding to each of the structural pixels to form the structural points and the corresponding openings; and then according to the color pixel data, the print head ejects the color ink at each of the openings corresponding to the structural points to form color structural points. The color pixel data is correlated to the structural pixel data, that is, the spatial coordinate value of each color pixel is correlated to the spatial coordinate value of each structural pixel.

Further, S3031 may be performed.

In S3031: S301 and S3021 are repeatedly performed to form a plurality of layer-print products.

S301 and S3021 are performed synchronously, e.g. the process of forming the layer-structure product and the process of printing using the color ink are simultaneous. Therefore, the print head can print a layer-print product during one printing process and form another layer-print product during a next printing process, so as to form the plurality of layer-print products by repeating the above printing process.

A printing principle of S3022 is similar to S3021, except that the manner in which S3022 and S301 are cooperatively implemented is different. The print head prints one layer-structure product in one printing process (achieved by executing S301), and in a next printing process, prints one layer-print product by using the color ink on the layer-structure product. Therefore, in the second main line process, two printing processes may be needed to form one layer-print product, while only one printing process may be needed to form one layer-print product in the first main line process. Based on a curing speed of the molding material and a color complexity of the colored 3D object, it can be determined which main line process to be used for printing. Optionally, if the curing speed is quick and the color complexity is low, the first main line process may be used, and otherwise, the second main line process may be used.

Further, S3032 may be performed.

In S3032: S301 and S3022 are repeatedly performed to form a plurality of layer-print products.

In the second main line process, S301 and S3022 are performed alternately. Therefore, the difference between S3022 and S3021 is that for based a same quantity of the layer-structure products, a number of printing processes that S3032 needs to repeat is twice of a number of printing processes that S3031 needs to repeat. That is because, in the second main line process, two printing processes are required to form one layer-print product. When the curing speed of the molding material is slow, and the color complexity of the colored 3D object is relatively high, the second main line process is usually used as the printing method.

Further, on the basis of the foregoing multiple steps, S304 may be performed.

In S304: The plurality of layer-print products may be stacked one on another to fabricate the colored 3D object. The implementation manner of S304 is consistent with that of S104, and is not repeated herein.

Figure 6:
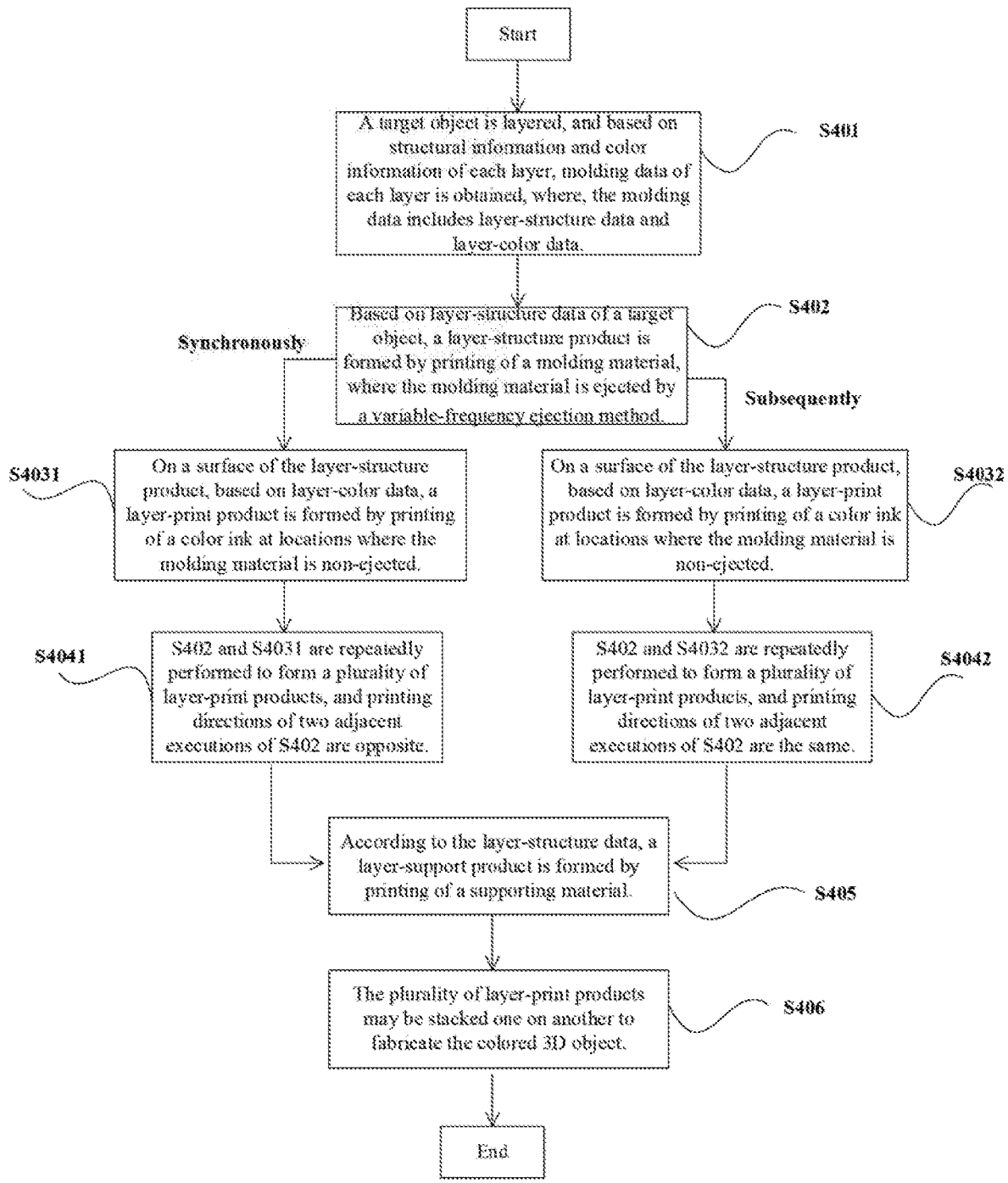
FIG. 6 illustrates a flow chart of an exemplary method for fabricating a colored 3D object using a variable-frequency ejection method to eject a molding material including layering and obtaining molding data according to some embodiments of the present disclosure.

According to an embodiment of the present disclosure, FIG. 6 illustrates a flow chart of an exemplary method for fabricating a colored 3D object using a variable-frequency ejection method to eject a molding material including layering and obtaining molding data according to some embodiments of the present disclosure, and the method may include the following steps. The method may include the following exemplary steps In S401: A target object is layered, and based on structural information and color information of each layer, molding data of each layer is obtained, where, the molding data includes layer-structure data and layer-color data. The implementation manner of S401 is consistent with that of S201, and is not repeated herein.

Further, on the basis of S401, S402-S4041 (the first main line process) or S402-S4042 (the second main line process) may be performed, and the implementation manner can refer to descriptions about S301-S3031 or S301-S3032 as shown in FIG. 3. However, compared to S3031, S4041 further describes that when S402 and S4031 are repeatedly performed to form the plurality of layer-print products, printing directions of two adjacent executions of S402 are opposite. In conventional technologies, the print head can print a layer-print product in one printing process, and when the print head starts a next printing process, the print head need to reposition backward and then continue to synchronously execute S402 and S4031. In this way, printing directions of S402 in two adjacent printing processes are the same (two adjacent executions of S2031 have the same printing direction). Whereas, according to embodiments of the present disclosure, after one printing process is completed, the backward reposition process can be omitted, and the next printing process is performed in an opposite direction with respect to the printing direction of the previous printing process. Therefore, in two adjacent printing processes, the printing directions of S402 are opposite (the printing directions of two adjacent executions of S4031 are also opposite). Compared to conventional technologies, embodiments of the present disclosure can omit the backward reposition process, thereby significantly improving the molding efficiency.

In addition, according to embodiments of the present disclosure, compared to S3032 shown in FIG. 3, S4042 further describes that when S402 and S4032 are repeatedly performed to form the plurality of layer-print products, printing directions of two adjacent executions of S402 are the same. Similar to S4041 of the first main line process, in S4042 of the second main line process, after one printing process is completed, the backward reposition process can also be omitted. In the second main line process, S402 and S4032 are performed alternately. When S4042 is performed, e.g. when S402 and S4032 are repeatedly performed, after the backward reposition process is omitted, the printing directions of S402 and S4032 are opposite. Correspondingly, printing directions of two adjacent S402 are the same. Similarly, when the curing speed is low, and the color complexity is high, through the printing method of the second main line process, the molding efficiency can also be improved.

Moreover, when S4041 or S4042 is performed, S405 may be also executed.

In S405: According to the layer-structure data, a layer-support product is formed by printing of a supporting material, where the layer-support product is configured to provide support for two adjacent layer-print products. The implementation manner of S405 is consistent with that of S205 and is not repeated herein.

Further, based on the foregoing multiple steps, S406 may be performed.

In S406: The plurality of layer-print products may be stacked one on another to fabricate the colored 3D object. A implementation manner of S406 is consistent with that of S104, and is not repeated herein.

Optionally, the molding material according to an embodiment of the present disclosure may be a photosensitive resin material, and the color inks may be Eco solvent inks. The photosensitive resin material may have a viscosity of 14 to 180 cps at an ambient temperature (usually set at 25° C.), and a viscosity of 5 to 15 cps at 25 to 80° C. The Eco solvent inks may have a viscosity of 4 to 14 cps and a surface tension 22 to 35 mN/m. The molding material is used to fabricate the structural part of the colored 3D object, the color inks can at least partially infiltrate into the layer-structure product to form the layer-print product, and the color inks can be quickly vaporized and dried, so as to complete coloring of the layer structural part.

According to embodiments of the present disclosure, a basic principle of selecting a color of the molding material is that the color of the molding material should not affect the color development of the color inks on the surface of the molding material. Accordingly, the molding material may be any one of a white material, a transparent material, or a light color material.

Further, in conventional technologies, the commonly used color inks may be solvent-based inks or water-based inks. However, the solvent-based inks have been used less frequently because of the environmental problem caused by the solvent-based inks. Although the water-based inks are environmentally friendly, the water-based inks have a slow drying speed and are easy to bleed. Embodiments of the present disclosure adopts a layer-by-layer bidirectional printing technology, i.e. during the movement of the print head, the print head may keep performing printing, including ejecting the molding material or ejecting the color inks, which can improve the printing efficiency. However, if at this time, the water-based inks are used, the water-based inks cannot be sufficiently dried, and the bleeding problem may be aggravated. To solve the above problem, according to embodiments of the present disclosure, Eco solvent inks may be used for coloring, which not only can avoid bleeding phenomenon, but also is more environmentally friendly.

Examples of photosensitive resin materials and Eco solvent inks according to embodiments of the present disclosure are listed in Tables as follows.

EXAMPLE ONE

Formula Table

| Photosensitive resin | | Eco solvent ink | | | |
| --- | --- | --- | --- | --- | --- |
| | Weight | | Weight percentage/% | | |
| Composition | percentage/% | Composition | Blue | Red | Yellow |
| N-butyl acryloyloxy ethyl carbamate, Genomer 122 | 30 | Carbitol acetate | 35 | 35 | 35 |
| 6115J-80 | 26.17 | Dipropylene glycol monothyl ether | 14 | 14 | 14 |
| Isobornyl acrylate | 25 | Propylene-glycol diethyl ether | 10 | 10 | 10 |
| Trimethylolpropane ethoxylate triacrylate | 4 | ε-caprolactone | 13 | 13 | 13 |
| Tricyclodecane dimethanol diacrylate | 10 | Vinisol, VYHD | 10 | 10 | 10 |
| 2,4,6-trimethyl-benzoyldiphenyl phosphine oxide | 3 | BYKJET 9133 | 2 | 2 | 2 |
| 2-methyl-1-[4-methylthio-phenyl]-2-morpholinyl-1-propanone | 1 | BYK 333 | 1 | 1 | 1 |
| 4-Methoxyphenol | 0.8 | Blue pigment 15:3 | 15 | | |
| BYK377 | 0.03 | Red pigment 178 | | 15 | |
| | | Yellow pigment 83 | | | 15 |

EXAMPLE ONE

Parameter Table

| | Materials | | | |
| --- | --- | --- | --- | --- |
| | Photosensitive | Eco solvent ink | | |
| Parameters | resin | Blue | Red | Yellow |
| Viscosity (at ambient temperature) cps | 178.8 | 13.8 | 13.8 | 13.6 |
| Viscosity (at printing temperature) cps | 12.9 | 13.8 | 13.8 | 13.6 |
| Surface tension (at ambient temperature) mN/m | 24.8 | 27.3 | 27.3 | 27.3 |
| Surface tension (at printing temperature) mN/m | 23.9 | 27.3 | 27.3 | 27.3 |

EXAMPLE TWO

Formula Table

| Photosensitive resin | | Eco solvent ink | | | |
| --- | --- | --- | --- | --- | --- |
| | Weight | | Weight percentage/% | | |
| Composition | percentage/% | Composition | Blue | Red | Yellow |
| EBECRYL 81 | 10 | Propylene glycol phenyl ether acetate | 57.8 | 57.8 | 57.8 |
| 4-Acryloyl-morpholine | 37 | Diethylene glycol butyl ether acetate | 22.5 | 22.5 | 22.5 |
| NPG2PODA | 45 | Vinisol, VYHD | 2 | 2 | 2 |
| Bis(2,4,6-trimethyl-benzoyl)phenyl-phosphine oxide | 3 | BYKJET-9133 | 2 | 2 | 2 |
| 1-Hydroxy-cyclohexyl phenyl ketone | 3 | BYK333 | 0.7 | 0.7 | 0.7 |
| RAD2100 | 1 | Blue pigment 15:3 | 15 | | |
| 4-Methoxyphenol | 1 | Red pigment 122 | | 15 | |
| | | Yellow pigment 155 | | | 15 |

EXAMPLE TWO

Parameter Table

| | Materials | | | |
| --- | --- | --- | --- | --- |
| | Photosensitive | Eco solvent ink | | |
| Parameters | resin | Blue | Red | Yellow |
| Viscosity (at ambient temperature) cps | 14.1 | 4.5 | 4.5 | 4.5 |
| Viscosity (at printing temperature) cps | 14.1 | 4.5 | 4.5 | 4.5 |
| Surface tension (at ambient temperature) mN/m | 24.7 | 30.2 | 30.2 | 30.2 |
| Surface tension (at printing temperature) mN/m | 24.1 | 30.2 | 30.2 | 30.2 |

EXAMPLE THREE

Formula Table

| Photosensitive resin | | Eco solvent ink | | | |
| --- | --- | --- | --- | --- | --- |
| | Weight | | Weight percentage/% | | |
| Composition | percentage/% | Composition | Blue | Red | Yellow |
| 3,4-Epoxy-cyclohexyl-methyl-3,4-epoxycyclohexane-carboxylate | 71 | Diethylene glycol monoethyl ether acetate | 24 | 24 | 24 |
| N-butyl glycidyl | 21 | dipropylene | 24 | 24 | 24 |

-continued

| Photosensitive resin | | Eco solvent ink | | | |
|---|---|---|---|---|---|
| Composition | Weight percentage/% | Composition | Weight percentage/% | | |
| | | | Blue | Red | Yellow |
| ether | | glycol monothyl ether | | | |
| Polycaprolactone polyol (205N) | 4.8 | Propylene glycol diethyl ether | 10 | 10 | 10 |
| Triarylsulfonium salt (Easepi6992) | 2.5 | ε-caprolactone | 15 | 15 | 15 |
| isopropyl thioxanthone | 0.7 | Vinisol, VYHD | 2 | 2 | 2 |
| | | BYKJET 9133 | 6 | 6 | 6 |
| | | BYK 333 | 1 | 1 | 1 |
| | | Blue pigment 15:1 | 18 | | |
| | | Red pigment 178 | | 18 | |
| | | Yellow pigment 83 | | | 18 |

EXAMPLE THREE

Parameter Table

| | Materials | | | |
|---|---|---|---|---|
| Parameters | Photosensitive resin | Eco solvent ink | | |
| | | Blue | Red | Yellow |
| Viscosity (at ambient temperature) cps | 34.9 | 8.8 | 8.6 | 8.7 |
| Viscosity (at printing temperature) cps | 5.6 | 8.5 | 8.3 | 8.5 |
| Surface tension (at ambient temperature) mN/m | 23.2 | 27.8 | 27.8 | 27.8 |
| Surface tension (at printing temperature) mN/m | 22.5 | 27.8 | 27.8 | 27.8 |

EXAMPLE FOUR

Formula Table

| Photosensitive resin | | Eco solvent ink | | | |
|---|---|---|---|---|---|
| Composition | Weight percentage/% | Composition | Weight percentage/% | | |
| | | | Blue | Red | Yellow |
| BAC-45 | 17.5 | Diethylene glycol monoethyl ether acetate | 24 | 24 | 24 |
| M150 | 25 | Dipropylene glycol monothyl ether | 24 | 24 | 24 |
| SR420 | 40 | Propylene glycol diethyl ether | 10 | 10 | 10 |
| Triarylsulfonium salt (Easepi6992) | 1.5 | ε-caprolactone | 15 | 15 | 15 |
| BYK377 | 0.05 | Vinisol, VYHD | 2 | 2 | 2 |
| MEHQ | 0.45 | BYKJET 9133 | 6 | 6 | 6 |
| 1-Hydroxy- | 0.5 | BYK 333 | 1 | 1 | 1 |
| cyclohexyl phenyl ketone | | | | | |
| Unicryl R-7162 | 5 | Blue pigment 15:1 | 18 | | |
| CN131NS | 10 | Red pigment 178 | | 18 | |
| | | Yellow pigment 83 | | | 18 |

EXAMPLE FOUR

Parameter Table

| | Materials | | | |
|---|---|---|---|---|
| Parameters | Photosensitive resin | Eco solvent ink | | |
| | | Blue | Red | Yellow |
| Viscosity (at ambient temperature) cps | 35.2 | 8.8 | 8.6 | 8.7 |
| Viscosity (at printing temperature) cps | 10.3 | 8.5 | 8.3 | 8.5 |
| Surface tension (at ambient temperature) mN/m | 23 | 27.8 | 27.8 | 27.8 |
| Surface tension (at printing temperature) mN/m | 22 | 27.8 | 27.8 | 27.8 |

Optionally, according to an embodiment of the present disclosure, a non-variable-frequency ejection method may be used to eject the molding material. For example, the photosensitive resin may be ejected to each pixel to print the layer-structure product; the Eco solvent color inks may be ejected on the layer-structure product; and because the Eco solvent color inks can partially infiltrate into the layer-structure product due to the osmosis of the Eco solvent color inks, a color structure layer can be formed.

Figure 7:
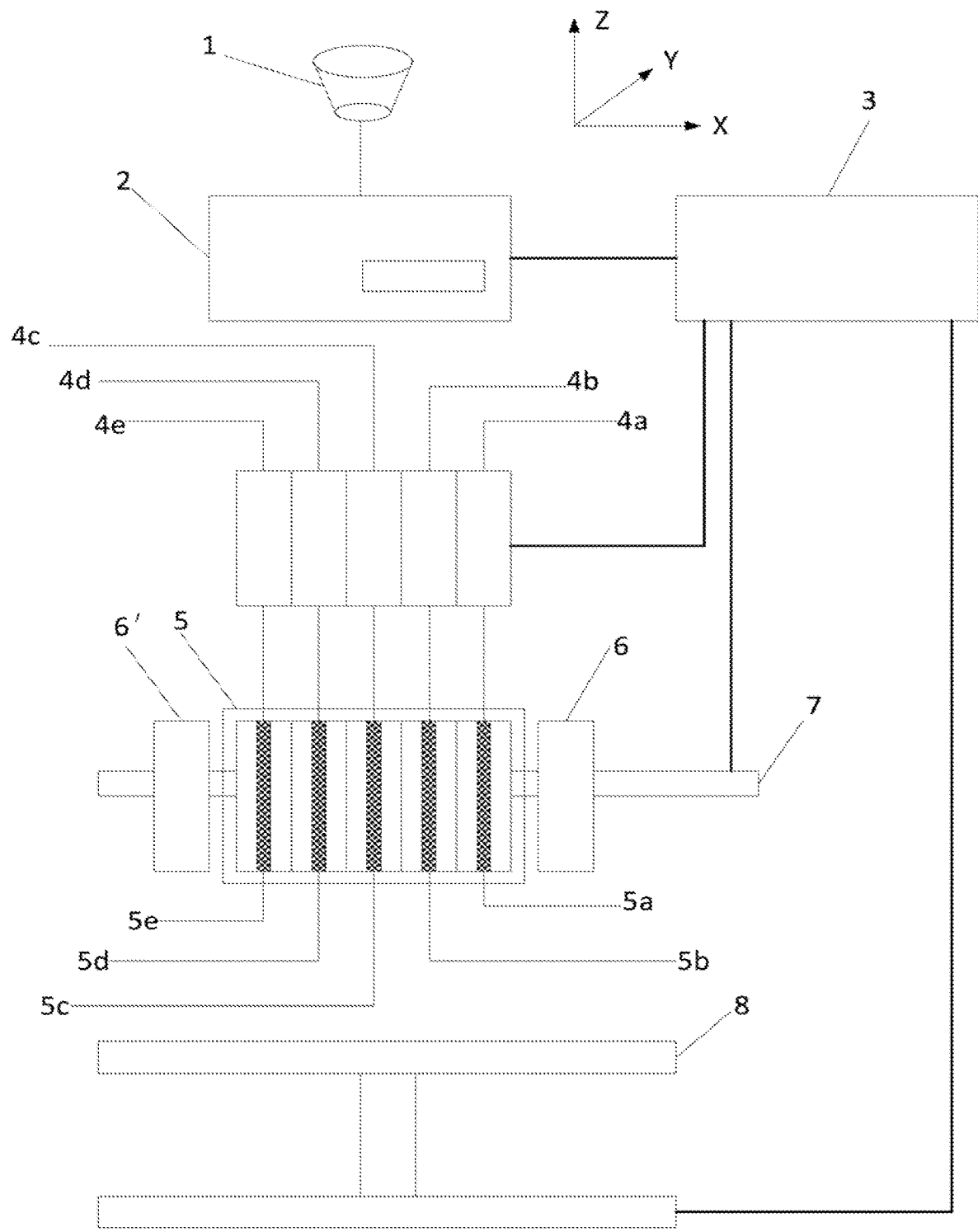
FIG. 7 illustrates a schematic diagram of an exemplary system for fabricating a colored 3D object configured with a channel of a molding material according to some embodiments of the present disclosure.

FIG. 7 illustrates a schematic diagram of an exemplary system for fabricating a colored 3D object configured with a channel of a molding material according to some embodiments of the present disclosure. The system may be configured to implement the method for fabricating a colored 3D object shown in FIGS. 1-3 and FIG. 6. The system may include a processing terminal 2 configured to layer the target object 1 and obtain the molding data according to the structural information and the color information of each layer; and a drive controller 3 configured to control a print head 5 to perform printing according to the molding data.

Further, the functions of the processing terminal 2 and the drive controller 3 may be implemented by a hardware, a software executed by a processor, or a combination of both. Optionally, if a software module is used to implement the functions of the processing terminal 2 and the drive controller 3, a program may be loaded into the processor in advance or the software may be installed in a preset programed system. If the hardware is used to implement the functions of the processing terminal 2 and the drive controller 3, a field-programmable gate array (FPGA) may be used to realize immobile implementation of the corresponding functions.

Further, the software module may be stored in a RAM memory, a flash memory, a ROM memory, an EPROM memory, a hard disk, or any other form of storage medium known in the art. By coupling the storage medium to a processor, the processor is enabled to read information from the storage medium and write information to the storage medium. Optionally, the storage medium may be an integral part of the processor, or both the processor and the storage medium may be located on an application specific integrated circuit (ASIC).

Further, the hardware may be a general-purpose processor, a digital signal processor (DSP), an ASIC, a FPGA or other programmable logic device, a discrete gate or transistor logic device, and a discrete hardware component or a combination of the above hardware, which can implement the corresponding functions. Optionally, the corresponding functions may also be implemented by a combination of computing devices, for example, a combination of a DSP and a microprocessor, a combination of a plurality of microprocessors, and a combination of one or more microprocessors communicatively connected with a DSP, etc.

Further, below describes a system for fabricating the colored 3D object in detail referring to FIG. 7. FIG. 7 shows the target object 1, a supporting material container 4e, color ink containers 4b, 4c and 4d, a molding material container 4a, the print head 5, LED lights 6 and 6', a guide rail 7 and a lifting platform 8. For example, the colored 3D object can be fabricated consistent with the method described in FIG. 2. The processing terminal 2 can obtain the molding data of the target object 1 as in S201, where the molding data includes the layer-structure data and the layer-color data. The processing terminal 2 may send the molding data to the drive controller 3. The drive controller 3 may control the print head 5 to complete the printing process via the second main line process shown in FIG. 2.

Further, the drive controller 3 may control the print head 5 to print. As shown in FIG. 7, the print head 5 may include a channel 5e of the supporting material, a channel 5a of the molding material, channels 5b, 5c, 5d of the color inks. The channel 5e of the supporting material may be connected to the supporting material container 4e through a connection tube, the channel 5a of the molding material may be connected to the molding material container 4a through a connection tube, and the channels 5b, 5c, and 5d of the color inks may be connected to the color ink containers 4b, 4c and 4d through connection tubes. The supporting material, the molding material, and the color inks may be transported from the supporting material container 4e, the molding material container 4a, and the color ink containers 4b, 4c and 4d, respectively, to the print head 5, and ejected through the ejection orifices. Optionally, the color ink containers 4b, 4c and 4d may be containers for red ink, yellow ink and blue ink, respectively. Correspondingly, the channels 5b, 5c and 5d of the color inks may be channels of red ink, yellow ink and blue ink, respectively. According to a color management theory, mixing the three primary colors of magenta (M), yellow (Y), and cyan (C) according to different ratios can achieve full colors. Optionally, it is also possible to use magenta (M), yellow (Y), cyan (C) and black (BK) to achieve full colors. The channels of color inks of the print head 5 may include three channels M, Y and C or four channels M, Y, C and BK, which is not limited by the present disclosure.

Further, the print head 5 may be controlled by the drive controller 3 to move forward in a direction X on the guide rail 7. During the movement of the print head 5 in the direction X, the channel 5a of the molding material may eject the molding material. At a same time, based on the layer-structure data, the drive controller 3 may control the print head 5 to eject the supporting material through the channel 5e of the supporting material to locations where the supporting material is needed. The ejected molding material and supporting material can be cured by irradiation of the LED light 6' disposed at one side of the print head 5, such that S202 can be implemented after one printing process is completed. Then, in the next printing process, the print head 5 can be controlled by the drive controller 3 to move forward in a direction —X on the guide rail 7. During the movement of the print head 5 in the direction —X, the color inks may be ejected through the channels 5b, 5c and 5d of the color inks and the ejected color inks can be cured by irradiation of the LED light 6 on another side of the print head 5. Such that, S2032 can be implemented after one printing process is completed. After that, the print head 5 is moved by one step in a direction Y, and the above two printing processes are repeatedly performed, so that one layer of printing can be completed by repeating the above processes.

Further, after one layer of printing is completed in the above manner, the drive controller 3 may control the lifting platform 8 to descend a certain height in a direction −Z, and a next layer of printing can be completed in the above manner. Optionally, the lifting platform 8 may be descended gradually based on a thickness of each layer, and the descending of the lifting platform 8 can be achieved by a servo motor and a screw. Optionally, the descending range of the lifting platform 8 may be larger than the thickness of each layer and is not limited by the present disclosure.

Figure 8:
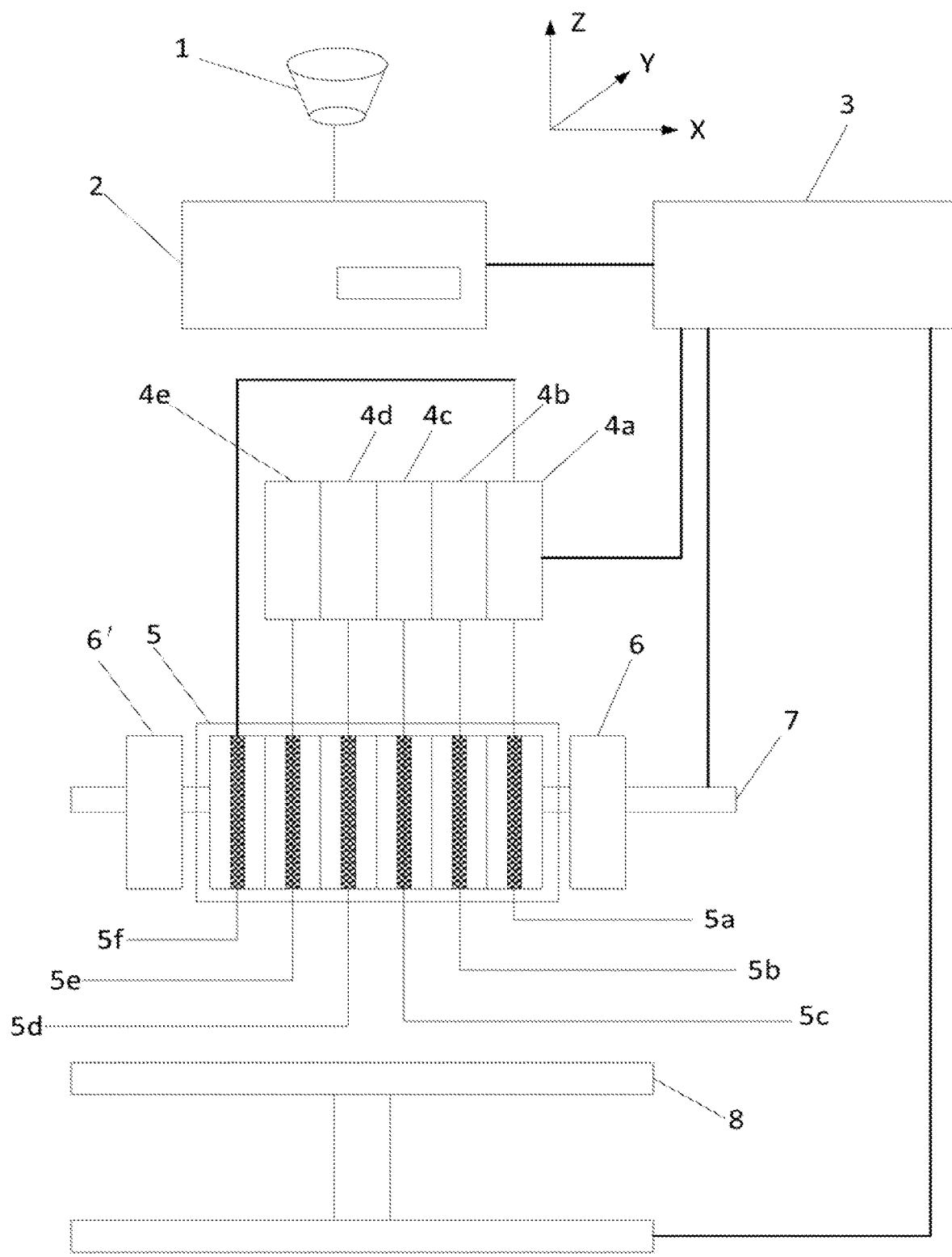
FIG. 8 illustrates a schematic diagram of an exemplary system for fabricating a colored 3D object configured with two channels of a molding material according to some embodiments of the present disclosure.

FIG. 8 illustrates a schematic diagram of an exemplary system for fabricating a colored 3D object configured with two channels of a molding material according to some embodiments of the present disclosure. The difference between FIG. 8 and FIG. 7 is that the print head 5 shown in FIG. 8 includes two channels 5a and 5f of the molding material, respectively disposed at two sides of the channels of the color inks. Below describes a process of fabricating the colored 3D object in detail referring to FIG. 8. FIG. 8 shows the target object 1, the supporting material container 4e, the channels 4b, 4c and 4d of the color inks, the molding material container 4a, the print head 5, the LED lights 6 and 6', the guide rail 7 and the lifting platform 8. For example, the colored 3D object can be fabricated by the system for fabricating the colored 3D object shown in FIG. 8 using the method for fabricating the colored 3D object shown in FIG. 2. The processing terminal 2 can obtain the molding data of the target object 1 through S201, where the molding data includes the layer-structure data and the layer-color data. The processing terminal 2 may send the molding data to the drive controller 3. The drive controller may complete the printing process via the first main line process shown in FIG. 2.

Further, the print head 5 may be controlled by the drive controller 3 to move forward in a direction X on the guide rail 7. During the movement of the print head 5 in the direction X, the channel 5a of the molding material may eject the molding material, and the color inks may be ejected through the channels 5b, 5c and 5d of the color inks. The ejected molding material can be cured by irradiation of the LED light 6' disposed at one side of the print head 5, such that S202 and S2031 can be implemented synchronously. At a same time, based on the layer-structure data, the drive controller 3 may control the print head 5 to eject the supporting material through the channel 5e of the supporting material to locations where the supporting material is needed. The ejected molding material can be cured by irradiation of the LED light 6' disposed at one side of the print head 5. Then after one printing process in the direction X is completed, the print head 5 may be moved by one step in the direction Y, and starts the next printing process in the direction —X. During the movement of the print head 5 in the direction –X, the channel 5f of the molding material may eject the molding material, and the color inks may be ejected through the channels 5b, 5c and 5d of the color inks. At a same time, based on the layer-structure data, the drive controller 3 may control the print head 5 to eject the supporting material through the channel 5e of the supporting material to locations where the supporting material is needed. The ejected molding material and supporting material can be cured by irradiation of the LED light 6 disposed at another side of the print head 5, such that one printing process can be completed.

Further, one layer of printing can be completed by continuously repeating two printing processes described above. After one layer of printing is completed, the drive controller 3 may control the lifting platform 8 to descend a certain height in a direction –Z, and a next layer of printing can be completed in the same manner. Optionally, the lifting platform 8 may be descended gradually based on a thickness of each layer, and the descending of the lifting platform 8 can be achieved by a servo motor and a screw. Optionally, the descending range of the lifting platform 8 may be larger than the thickness of each layer and is not limited by the present disclosure.

According to embodiments of the present disclosure, the two channels 5a and 5f of the molding material may be respectively disposed two sides of the channels of the color inks. During the printing process, when the print head 5 is moved in the direction X, the molding material may be ejected through the channel 5a of the molding material; and when the print head 5 is moved in the direction –X, the molding material may be ejected through the channel 5f of the molding material. Therefore, the ejection of molding material and the ejection of the color inks can be achieved synchronously. In addition, during a whole process that the print head 5 is moved in the direction X and the direction –X, the print head 5 can continuously perform printing. Therefore, the system described above, compared to the system for fabricating the colored 3D object with only one channel of molding material, can achieve improved molding efficiency of the colored 3D object.

Figure 9:
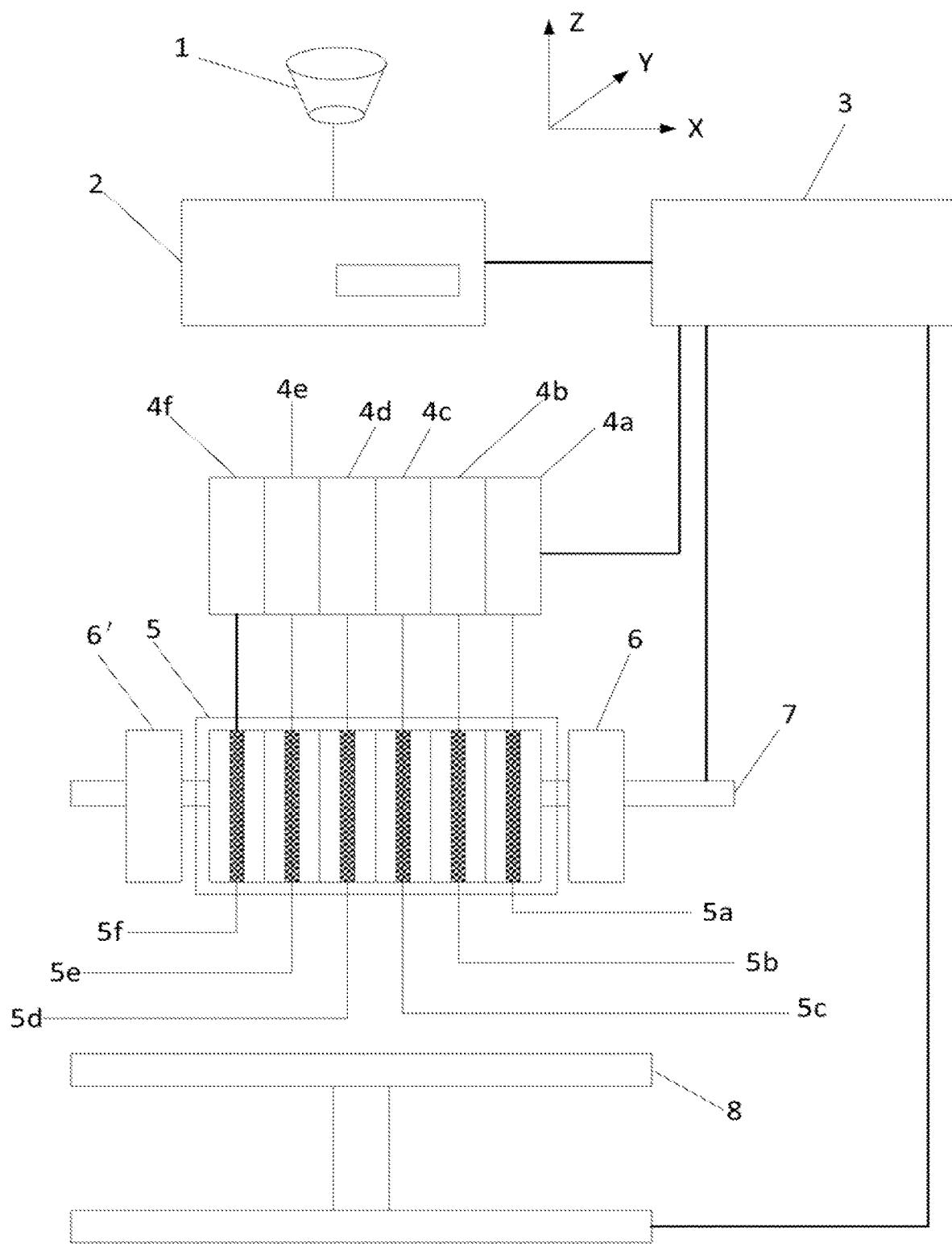
FIG. 9 illustrates a schematic diagram of another exemplary system for fabricating a colored 3D object configured with two molding material containers according to some embodiments of the present disclosure.

Further, as shown in FIG. 8, the molding material may be ejected from the molding material container 4a through the channels 5a and 5f of molding material. FIG. 9 illustrates a schematic diagram of another exemplary system for fabricating a colored 3D object configured with two molding material containers according to some embodiments of the present disclosure. Optionally, referring to FIG. 9, the system for fabricating the colored 3D object may further include another molding material container 4f. The channel 5a of the molding material may be connected to the molding material container 4a, while channel 5f of the molding material may be connected to the molding material container 4f, such that the channels 5a and 5f of the molding material may eject two different molding materials. Optionally, the system for fabricating the colored 3D object may further include more than two channels of molding material and correspondingly more than two molding material containers, so as to improve the ejection efficiency of the molding material and molding efficiency of the colored 3D object, which is not elaborated herein.

Figure 10:
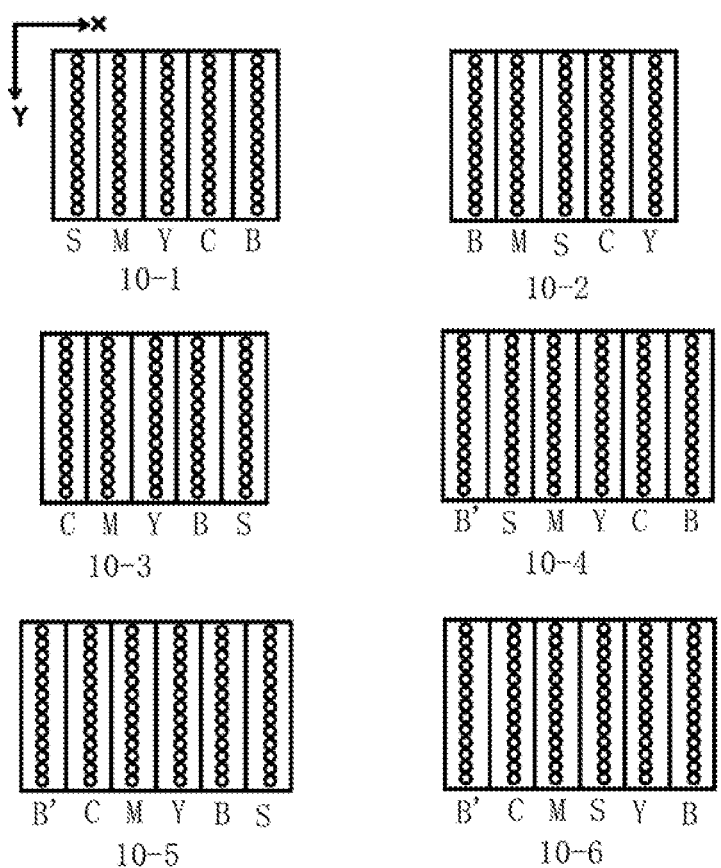
FIG. 10 illustrates a schematic diagram of an exemplary arrangement of channels of color inks and channels of a molding material according to some embodiments of the present disclosure.

Further, FIG. 10 illustrates a schematic diagram of an exemplary arrangement of channels of color inks and channels of a molding material according to some embodiments of the present disclosure. FIG. 10 shows two arrangements of channels of color inks and channels of the molding material. One arrangement may be the channel of the molding material is disposed at a same side of the channels of color inks, and may be configured to implement the second main line process of the methods for fabricating the colored 3D object described above. The other arrangement may be the two channels of the molding material are respectively disposed at two sides of the channels of color inks, and may be configured to implement the first main line process of the methods for fabricating the colored 3D object described above. FIGS. 10-1 to 10-3 show a channel B of the molding material, a channel S of the supporting material, and channels of the color inks. The channels of the color inks may include a channel M (a channel of red ink), a channel Y (a channel of yellow ink) and a channel C (a channel of blue ink). The channel S of the supporting material may be disposed between the channel M, the channel Y and the channel C of the channels of the color inks, or disposed at one side of the channels of the color inks. The channel B of the molding material may be disposed at one side of the channels of the color inks, but may not be disposed between the channel M, the channel Y and the channel C of the channels of the color inks.

FIGS. 10-4 to 10-6 show two channel B and B' of the molding material, a channel S of the supporting material, and channels of the color inks. The channels of the color inks may include a channel M (a channel of red ink), a channel Y (a channel of yellow ink) and a channel C (a channel of blue ink). The channel S of the supporting material may be disposed between the channel M, the channel Y and the channel C of the channels of the color inks, or disposed at one side of the channels of the color inks. The channel B and B' of the molding material may be respectively disposed at two sides of the channels of the color inks, but may not be disposed between the channel M, the channel Y and the channel C of the channels of the color inks.

Further, the channel of the molding material may not be disposed between the channel M, the channel Y and the channel C of the channels of the color inks, which is because that there is a sequential order between the ejection of the color inks and the ejection of the molding material. Even if the color inks and the molding material are ejected synchronously, it is necessary to form a structural point first, and then color the structural point, that is, the formation of each structural point is a unit of the sequential order. Correspondingly, the layer-support product formed by the supporting material does not need to be colored. Therefore, the channel S of the supporting material may be disposed between the channel M, the channel Y and the channel C of the channels of the color inks. FIG. 10 shows six examples of arrangements but does not includes all examples of the arrangements. Those skilled in the art can make more variations based on FIG. 10.

Compared to the system for fabricating the colored 3D object implementing the method shown in FIG. 2, a system implementing the method shown in FIG. 3 or FIG. 6 may have a different controlling manner of the controller 3 on the channel of the molding material. In the system implementing the method shown in FIG. 3 or FIG. 6, the controller 3 may need to control the channel of the molding material to realize variable-frequency ejection method. Optionally, each of the ejection orifice of the channel of the molding material may correspond to one liquid chamber, a supply chamber, a piezoelectric element and a vibration plate. The piezoelectric element may include an upper electrode, a lower electrode, a piezoelectric body, where the upper electrode may include an electric sheet, each electric sheet may be connected to each corresponding switch circuit, and the drive controller 3 can control on/off of each electric sheet through each the switch circuit. Based on the layer-structure data obtained, the drive controller 3 can control on/off of each electric sheet though each switch circuit, so as to control whether the ejection orifice ejects or not. For example, when a driving electric voltage is supplied to the electric sheet, a potential difference is generated between the chip and the lower electrode, and the piezoelectric element is deformed to generate an instantaneous stress acting on the vibration plate. Therefore, the vibration plate may generate a certain displacement, and liquid may flow from the supply chamber to the liquid chamber. Then the driving electric voltage may be removed from or a reverse electric voltage may be applied to the electric sheet, the piezoelectric element may be restored to an original shape or deformed in an opposite direction. The resulting stress causes the vibration plate to return to its original shape or vibrate in an opposite direction to generate a certain displacement. Therefore, droplets can be ejected from the ejection orifices, thereby completing one ejection process.

Above describes embodiments of the present disclosure. It should be understood that the present disclosure is not limited to the above embodiments, and based on the above embodiments, those skilled in the art can make variations or modifications, which are not limited herein. Any variation or modification without creative efforts shall fall within the scope of the claims.

What is claimed is:

1. A method for fabricating a colored 3D object by layer-by-layer printing, comprising:
   layering a target object;
   obtaining molding data corresponding to each layer of the target object according to structural information and color information of each layer of the target object, the molding data including layer-structure data and layer-color data
   forming, based on the layer-structure data of the target object, a layer-structure product by printing of a molding material, wherein the molding material is ejected with an ejection and the layer-structure product has a structure including a grid structure with openings;
   forming a layer-print product by printing color inks on the layer-structure product based on the layer-color data of the target object, wherein the color inks are printed synchronously or following the formation of the layer-structure product; and
   repeatedly forming the layer-print product to provide a plurality of the layer-print products, and fabricating the colored 3D object from the plurality of the layer-print products, stacked one on another, wherein
   the molding material is ejected by a print head with a plurality of ejection orifices, the plurality of ejection orifices including first orifices and second orifices,
   the molding material is only ejected through the first orifices, and
   the printing color inks is ejected through the second orifices to the openings of the grid structure.

2. The method according to claim 1, wherein at least a part of the color inks infiltrates into the layer-structure product to form the layer-print product.

3. The method according to claim 2, wherein:
   the molding material includes a photosensitive resin material, and
   the color inks include solvent inks.

4. The method according to claim 3, wherein:
   the photosensitive resin material has a viscosity of 14 cps to 180 cps at 25° C. and a viscosity of 5 cps to 15 cps at 25° C. to 80° C.; and
   the solvent inks have a viscosity of 4 cps to 14 cps, and a surface tension of 22 mN/m to 35 mN/m.

5. The method according to claim 1, wherein:
   the ejection is performed by an interval ejection or by alternating a full ejection with the interval ejection; and
   when forming the layer-print product, printing of the color ink is performed at locations where the molding material is non-ejected.

6. The method according to claim 5, wherein in the ejection, when the full ejection is performed, a quantity of ejection holes is an even number.

7. The method according to claim 1, wherein:
   when the layer-print product is formed following the formation of the layer-structure product, two adjacent layer-structure products are formed in a same printing direction; and
   when the layer-print product and the layer-structure product are synchronously formed, the two adjacent layer-structure products are formed in opposite printing directions.

8. The method according to claim 1, wherein repeatedly forming the layer-print product further includes:
   forming, according to the layer-structure data, a layer-support product by printing on a supporting material, wherein the layer-support product is configured to provide a support for two adjacent layer-print products.

9. The method according to claim 1, wherein forming the layer-structure product includes:
   using one molding material for printing; or
   using different molding materials for printing, wherein the different molding materials have a same shrinkage ratio.

10. The method according to claim 1, wherein the molding material includes one of a white material and a transparent material.

11. The method according to claim 1, wherein locations of the openings of the grid structure correspond to moving trajectories of the second orifices.

* * * * *